(12) United States Patent
Kao et al.

(10) Patent No.: US 7,941,435 B2
(45) Date of Patent: May 10, 2011

(54) SUBSTRING SEARCH ALGORITHM OPTIMIZED FOR HARDWARE ACCELERATION

(75) Inventors: Jung-Hong Kao, Los Altos, CA (US); Mete Yilmaz, Palo Alto, CA (US); Jungfu Tsao, San Jose, CA (US); Shoujung Jimmy Tsao, Fremont, CA (US); Mick Henniger, Buchanan Dam, TX (US)

(73) Assignee: Cisco Technology, Inc., San Jose, CA (US)

( * ) Notice: Subject to any disclaimer, the term of this patent is extended or adjusted under 35 U.S.C. 154(b) by 1267 days.

(21) Appl. No.: 11/497,868

(22) Filed: Aug. 1, 2006

(65) Prior Publication Data

US 2008/0033942 A1 Feb. 7, 2008

(51) Int. Cl.
*G06F 17/30* (2006.01)
*G06F 7/00* (2006.01)
*G06F 1/03* (2006.01)
*G11C 19/00* (2006.01)

(52) U.S. Cl. .......... 707/747; 713/190; 726/24; 708/252; 377/72

(58) Field of Classification Search ............. 707/6, 706, 707/747; 711/216; 377/72
See application file for complete search history.

(56) References Cited

U.S. PATENT DOCUMENTS

| | | | | |
|---|---|---|---|---|
| 6,785,389 B1 * | 8/2004 | Sella et al. | ....... | 380/46 |
| 7,366,910 B2 * | 4/2008 | Hanner | ....... | 713/179 |
| 2002/0053002 A1 * | 5/2002 | Brandin | ....... | 711/108 |
| 2002/0172179 A1 * | 11/2002 | Grimsrud | ....... | 370/342 |
| 2006/0212426 A1 * | 9/2006 | Shakara et al. | ....... | 707/3 |
| 2007/0244951 A1 * | 10/2007 | Gressel et al. | ....... | 708/252 |

OTHER PUBLICATIONS

Erdogan, Ozgun et al., "Hash-AV: Fast Virus Signature Scanning by Cache-Resident Filters" Department of Computer Science, Stanford University, 9 pages.

"The Rabin-Karp Algorithm" downloaded Oct. 18, 2006: http://www.eecs.harvard.edu/~ellard/Q-97/HTML/root/node43.html, 4 pages.

* cited by examiner

*Primary Examiner* — Taghi T. Arani
*Assistant Examiner* — Thaddeus Plecha
(74) *Attorney, Agent, or Firm* — Hickman Palermo Truong & Becker LLP; Daniel D. Ledesma

(57) ABSTRACT

Techniques are provided for generating a hash value for searching for substrings in a data stream without reading more than one element (e.g. one byte) at a time. According to one technique, a before a next element is added to an old hash value, the old hash value is circularly shifted one or more bits. The first original element is shifted a number of bits and XOR'ed against the old hash value. The next element is added to the old hash value. In one embodiment, an entry value is retrieved for each element from an index table and the XOR and shift operations are performed on the entry values. According to another technique, each Linear Feedback Shift Register (LFSR) of a plurality of LFSRs read in one element at a time beginning at different offsets. Each LFSR uses the same state machine. The result of reading a number of elements into an LFSR is used as the hash value.

15 Claims, 4 Drawing Sheets

SUBSTRING SEARCH ALGORITHM OPTIMIZED FOR HARDWARE ACCELERATION

FIELD OF THE INVENTION

The present invention generally relates to substring search algorithms, and more specifically to optimizing substring search algorithms using hardware components.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A common problem in computing is searching for one or more substrings in a file or a flow of packets in a network. For example, in order to find viruses buried in data files, it is necessary to look for specific sequences of bytes, called "signatures", which are known in advance and tend to number in the tens of thousands, and typically greater than 100,000. It is CPU-intensive to check each signature against the data file, since 100,000 compare operations are needed for each byte offset in the data file being searched. For example, if the data file is 64 KB in size and the 100,000 digital signatures are all 32 bytes in length then approximately 6.4 billion [(64,000−32+1)*100,000] compare operations must be performed to ensure that the data file is free of the known viruses.

An alternative is to truncate all signatures to a fixed length (e.g. length L) and place each of the known signatures into a hash lookup table. When processing a data file, at every given byte offset, it is only necessary to hash an L consecutive byte sequence in the data file, and then check to see if the sequence matches any of the L bytes of a signature by consulting the hash lookup table.

However, a problem with such an approach is that for each subsequent byte of the data file, the L-byte sliding window is moved forward one byte, and the hash is recomputed. For an M byte data file, it is thus necessary to hash (M−L+1) times. This approach can be expensive since the hash function must re-read (L−1) bytes of the data file, plus the new byte so that the data can be run through the hash function. It is possible that the L−1 bytes of a data file might be cached if L were small enough to fit into a cache. However, for substring searches where L is larger than the available cache, the entire L−1 bytes must be reread as the sliding window is advanced by one byte.

The overhead of computing the hash value of a given sequence of bytes can be greatly decreased if the hash result is independent of the position of the elements in the L bytes being cached. Having each element (usually each element is a byte) act orthogonally on the resultant hash, and shifting the oldest element out of and the newest element into the domain of elements being cached is called a "Rolling Hash". Rolling Hash was introduced in 1986 as part of the Rabin-Karp substring search algorithm, available at in the document "ibmrd3102P.pdf" in the directory "/journal/rd/312/" of the domain research.ibm.com on the World Wide Web. The Rabin-Karp algorithm proposes that a hash value be the sum of elements, as digits of a base "P" and bounded by the size of the accumulator holding the hash result. For example, if the rolling hash contains the 5 element substring "ABCDE" of the string "ABCDEFG", and the base, P were 109, then the running hash value would be:

HashVal=$A*109^4+B*109^3+C*109^2+D*109+E$

In order to slide the window to the right and include "BCDEF", the operations to perform include 1) removing the weighting of "A", by subtracting the value (i.e. $A*109^4$); 2) multiplying the result by 109; and 3) adding in the value of "F". The result of these three operations is the following new value:

HashVal=$B*109^4+C*109^3+D*109^2+E*109+F$

If a modulo equal to the precision of the rolling hash accumulator is used, then each re-computation of the hash value as the window slides to the right includes 1) two multiplication operations (e.g. $A*109^4$ must be computed, as well as the previous step 2's multiply by 109); 2) one addition operation (to add in the new value), and 3) one subtract operation (e.g. to subtract out $A*109^4$)

Due to the properties of modulo arithmetic, the fact that the hash accumulator overflows does not compromise the newly computed hash value. (The modulo must be relatively prime to the base, P, which is usually satisfied by using a prime value for P to insure it is relatively prime to the modulus.)

The Rabin-Karp substring search algorithm is useful for multi-substring searches. Various anti-virus software uses the algorithm for searching for virus signatures. However, even though the Rabin-Karp algorithm works well on a general purpose CPU, attempting to implement the algorithm in an application-specific integrated circuit (ASIC) or a field-programmable gate array (FPGA) using a hardware-based algorithm is problematic. The requirement for the two multiplication operations (needing to slide the rolling hash forward one element) places an unwanted burden of the complexity of integer multiplication on an ASIC/FPGA chip.

In another approach (referred to hereinafter as hash-AV) for generating hash values in a substring search context, an exclusive or (XOR) operation and shift are applied on L bytes of data to, respectively, add a new byte and shift out an old byte. XOR and shift operations are readily implemented in hardware. However, such an approach also can be problematic. For example, in a data stream of repeated characters, applying an XOR operation between the same characters effectively cancels out the characters, which makes the resulting hash value useless.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
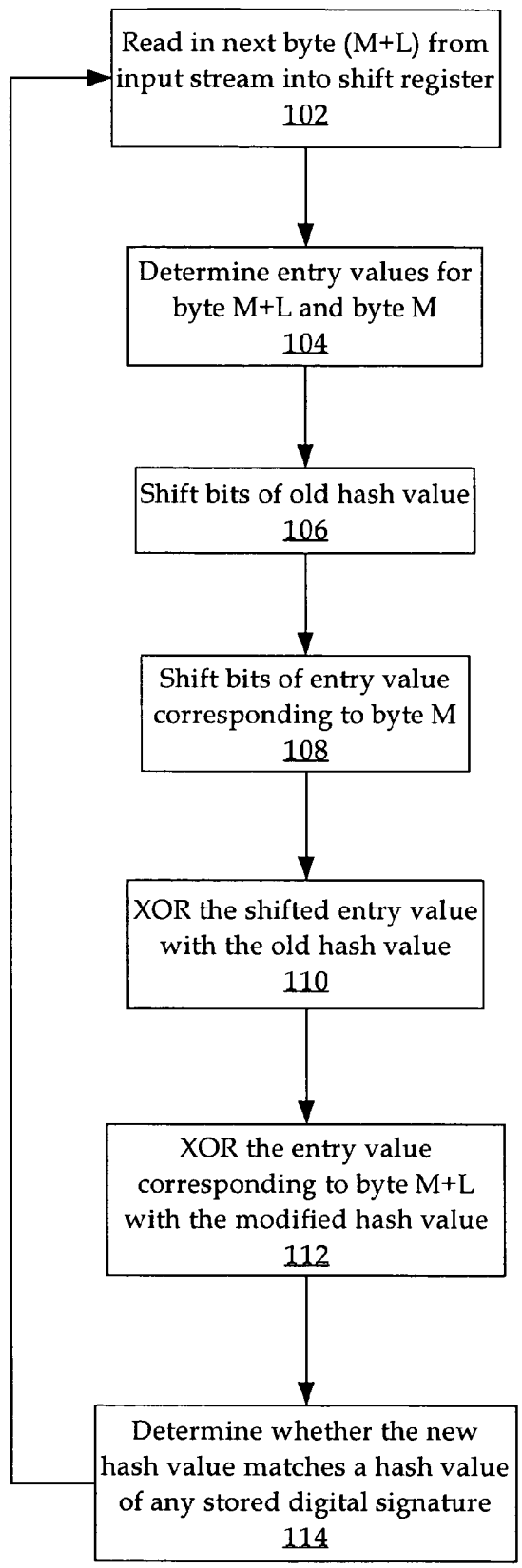
FIG. 1 is a flow diagram that illustrates the steps to implement a rolling hash using XOR and shift, according to an embodiment.

An apparatus, computer-readable medium and method for generating hash values are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Hardware-based Implementation of Generating Hashes
   2.1 XOR/Shift Rolling Hash
      2.1.1 Index Table
   2.2 Linear Feedback Shift Registers
   2.3 Cyclic Redundancy Check
3.0 Implementation Mechanisms-Hardware Overview
4.0 Extensions and Alternatives 1.0 Overview Three general approaches are described that are used to generate a hash value for a substring of characters in an input stream where only one element from the input stream (typically one byte) is read in at a time.

According to one embodiment, a rolling hash uses XOR and shift instead of multiplications, subtractions, and additions. Instead of applying the XOR and shift operations directly on the elements of the input stream, an index table is used into which each element indexes. The index table is an expanded bit substitution table that includes entries for each possible element from the input stream. The entry value (i.e. expanded bit value) corresponding to an element is typically the size of the resulting hash value. The entry values are chosen such that each entry value is substantially "different" from any other entry value so that when an entry value is shifted one or more times, the shifted entry value is not the same as (and is still substantially "different" than) any other entry value in the index table.

The first entry value that was originally added to the hash value is shifted a number of times (i.e. equal to the number of times the hash value has been shifted since the first entry value was added) and then XOR'ed against the previous hash value. This shifting and XOR'ing effectively removes the effect of the first entry value. The modified previous hash value is shifted at least one bit and then XOR'ed with the entry value corresponding to the new element. The resulting hash value is used to index into another data structure that maintains the hash value of stored digital signatures (e.g. possible viruses).

According to another embodiment, multiple linear feedback shift registers (LFSRs) are used to generate a hash value. Each LFSR of the multiple LFSRs implements the same state machine, begins at the same initial state, and begins processing elements from the input stream at different offsets. Once a LFSR has processed a number of elements equal to the size of the substring search "window", the hash value indicated by the LFSR is sent to the other data structure, mentioned above, that maintains the hash value of stored digital signatures. The LFSR is re-initialized to its original state and the next element from the input stream is processed by the LFSR.

According to another embodiment, a CRC checksum is generated for each set of L elements in a register. The checksum is the hash value that is used to index into the other data structure mentioned above. Instead of reading L elements each time to generate another checksum, only one element is read into the register at a time and the oldest element is shifted out of the register.

2.0 Hardware-Based Implementation of Generating Hashes

Embodiments of the invention are not limited to an element of a particular size. For example, an input element may be multiple bytes (e.g. 3 bytes) or a number of bits that do not correspond to a whole byte number (e.g. 12 bits). Embodiments of the invention are also not limited to the size of the hash result. However, in order to simplify the complexity of describing all possible implementations, embodiments will be described in the context of one-byte elements (i.e. an 8 bit octet) and 64 bit hash values 2.1 XOR/Shift Rolling Hash FIG. 1 is a flow diagram that illustrates implementing a rolling hash using XOR and shift, according to an embodiment. At step 102, a next byte (referred to hereinafter as "byte M+L") from an input stream is read into a shift register having the capacity of L bytes. Shifting the bytes in the shift register effectively shifts out the oldest byte in the shift register (referred to hereinafter as "byte M").

At step 104, entry values for bytes M+L and M are determined by looking up the entry values in an index table. Alternatively, the entry value corresponding to the oldest byte in the shift register may be cached (i.e. from when it was the "newest" byte in the shift register) so that only one index table lookup is performed.

At step 106, a shift operation is applied to the previous hash value of at least one bit. The previous hash value is based on byte M through byte M+L−1. At step 108, the shift operation is applied to the entry value corresponding to byte M a number of times equal to the number of times the rolling hash value has been shifted since the entry value corresponding to byte M was originally added to the rolling hash value (i.e. L times). At step 110, the shifted entry value corresponding to byte M is XOR'ed with the shifted previous hash value. This effectively subtracts byte M from the previous hash value.

Alternatively, steps 108 and 110 may occur before step 106. In that case, 1) the shift operation is applied to the entry value corresponding to byte M one less time (i.e. L−1 times) (step 108), 2) the shifted entry value corresponding to byte M is XOR'ed with the previous (un-shifted) hash value (step 110), and 3) the shift operation is then applied to the modified hash value (step 106).

At step 112, the effect of the new byte (i.e. byte M+L) is added to the rolling hash value by XOR'ing the entry value corresponding to byte M+L with the modified hash value (i.e. shifted and without the effect of byte M) resulting from step 110 (or step 106). Thus, the new hash value after completing step 112 includes only the effect of bytes M+1 through bytes M+L from the input stream.

At step 114, it is determined whether the new hash value resulting from steps 102-112 matches the hash value of any stored digital signature. Embodiments are not limited to any particular data structure(s) that indicates hash values for stored digital signatures. A hash lookup table is an example of a data structure that indicates the hash values of stored digital signatures. As another example, a bloom filter may be used that indicates whether a particular hash value is a member of a set of hash values of digital signatures indicated by the bloom filter.

After step 114, the process repeats itself for each byte in the input stream by proceeding to step 102.

If the shift operations of steps 106 and 108 were not performed (i.e. simply XOR'ing the L entry values together, then a number of shortcomings arise. First, the same L bytes will create the same hash regardless of the order in which the L bytes occur. In other words, there are L! different permutations that all collide to the same hash value. The order of bytes in a substring is important when determining whether a certain substring (e.g. virus) exists. If multiple non-virus signatures hash to the same value as a particular virus signature, then a significant number of false positives (e.g. an indication that a virus has been found where none exists) will be generated. Consequently, the time to accurately determine whether an input stream (e.g. data file or packet flow) contains a virus, for example, will significantly increase.

Second, an even number of repeated characters would result in the hash value of zero (since applying XOR twice effectively cancels the XOR operation), which results in an ineffective hash value and the increased possibility of generating a false positive. These two concerns are addressed by shifting the previous hash value before the entry value corresponding to byte M+L is added to the previous hash value.

If the number of bits in the hash result, B, and the number of bytes to match, L follow the relationship 1=L mod B, then the appropriate byte can be XOR'ed (without being shifted) with the hash value to remove its effect.

Figure 2:
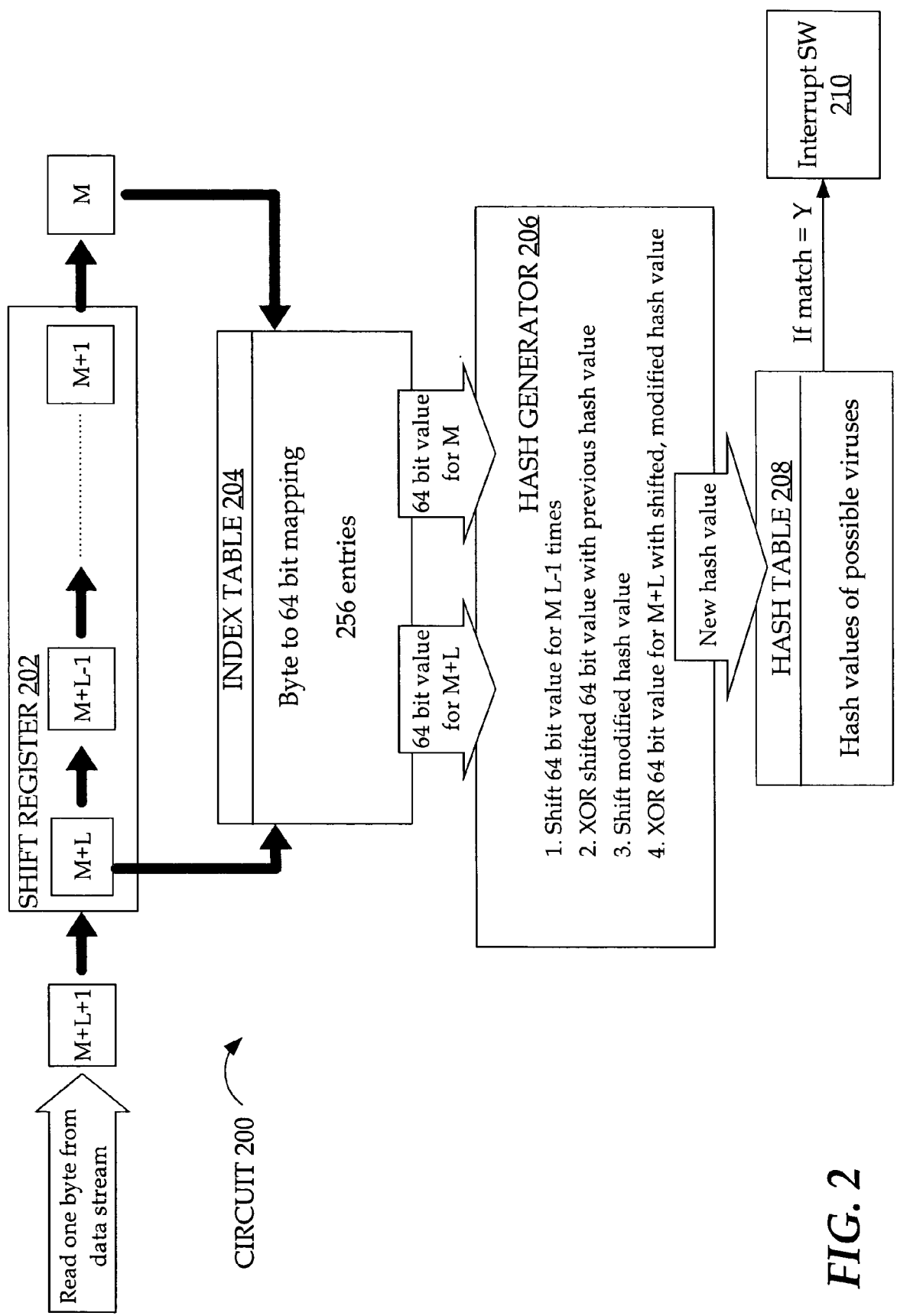
FIG. 2 is a block diagram that illustrates how a hash value is generated using XOR and shift after reading in one element from an input stream into a shift register, according to an embodiment.

FIG. 2 is a block diagram that illustrates a circuit 200 for generating a new hash value based on an old hash value based on reading one byte from an input stream into a shift register 202, according to an embodiment. Circuit 200 comprises a shift register 202 having a capacity of L bytes; an index table 204 coupled to shift register 202; a hash generator 206 having a hash key output and at least one entry input coupled to index table 204; and a hash table 208 having a match output and a hash key input coupled to the hash key output.

In the example illustrated in FIG. 2, the previous hash value is based on byte M through byte M+L−1. When byte M+L from the input stream is read into shift register 202, byte M is shifted out of shift register 202. Byte M+L and byte M are used to index into index table 204 to determine a corresponding 64-bit value from among the 256 entries (256 possible combinations of 8 bits) for each byte. If an element from the input stream is 12 bits as opposed to 8 bits, then index table 204 may store $2^{12}$=4096 entries. The preceding numeric values are provided as examples, and other bit lengths and numbers of entries may be used.

The two entry values corresponding to byte M+L and byte M are used by hash generator 306 to generate a new hash value based on the previous hash value. The process described above with respect to steps 106-114 is performed. The new hash value is used to index into hash table 208 that comprises the hash values for a plurality of stored digital signatures of, for example, possible viruses. At step 114, if is determined that a match exists, a hardware or software component associated with hash generator 206 is notified (block 210) which may perform a more thorough determination of whether the byte sequence of bytes M+1 through M+L meets certain criteria (e.g., whether the byte sequence is an actual virus), in case the determination at step 114 is a false positive.

In some cases, L is less than the number of bytes of a stored digital signature. For example, the L-byte register may hold a maximum of 8 bytes, whereas the stored digital signature is 32 bytes. In such cases, the hash value generated for each digital signature may be from any subset of L continuous bytes from the stored digital signature. Typically, however, a hash value is generated based on the first L bytes of the stored digital signature.

If it is determined that the hash value of the L bytes in shift register 202 matches the hash value of a stored digital signature, then control passes to the other hardware component or the software component (i.e. block 210). If L is less than the number of bytes of the stored digital signature, then the L bytes from shift register 202 are concatenated with the next N bytes from the packet flow (where L+N is the size of the stored digital signature) and the L+N bytes are compared with the stored digital signature.

In an embodiment, the L+N bytes are read into another register or a set of one or more registers (referred to hereinafter as the "L+N byte register") one byte at a time in parallel with shift register 202. Thus, at any given time when at least L+N bytes remain to be scanned, the L+N byte register comprises the L bytes in shift register 202 and the next N bytes in the input stream. Therefore, when two hash values match, the L+N bytes are immediately available in the L+N byte register in order for the other hardware component or software component to perform the byte-by-byte comparison.

2.1.1 Index Table

According to an embodiment, selection of entry values in index table 204 is performed to minimize the number of possible hash collisions over a specific set of byte sequences (e.g. digital signatures). In the absence of a specific set of signatures (in which the number of collisions can be empirically calculated based on a given sliding window width), general criteria may be followed to select entry values for index table 204.

The inventors have recognized as one general criterion that, according to this example, the 256 different 64 bit entry values should look significantly "different" from each other. When rotating (circular bit shift) any entry value, a rotated entry value of any byte should look significantly different from any arbitrarily rotated entry value of any of the other bytes. To look significantly different for a 64-bit value, at least 16 bits should change to transform any shifted (or un-shifted) entry value or complement of any entry value to any other shifted (or un-shifted) entry value or its complement. This difference is referred to as the "hamming distance". Thus, the entry values in index table 204 have a hamming distance of 16, but never more than 48. Other mechanisms of achieving differences can be used and still achieve the functions described here which use them. An example of a set of 256 64-bit values which meet this criteria are shown in the list below.

0: c69ff7f6d5d37857
1: 97fbfa2cf5aacb57
2: 75 6e63f3b5f1a20
3: b5dab4f99f78fcf3
4: 926995aa8abf17d8
5: bde81534d13ab1e3
6: 7b35976fdee060fb
7: bd6bfd318fbb21a
8: 1f62c8b48581b458
9: d52169ba3d7fc680
10: 461bc 510676cf3
11: f3a7b7b326c37e4a
12: 9311192a6a7f32f9
13: 4fed5212f41cb276
14: 876be6ae9c32bee3
15: f94aa657e77b636e
16: 7ba28778b8ece7db
17: d6914043f8d1cbfb
18: 946fdb4dc71b4aea
19: bfbb 9 a36577b29
20: 60ebc869ca 4b149
21: bd4562a1106dc718
22: d8306e9088bc3b1a
23: 4df3c2c559f6845a
24: e2c2a7202cd1f9e8
25: 67c0876ff1ebedc9
26: 829bf3b4 29bb75c 27: d679cccbd8c2489b
28: 73 a5cd1224ee09c
29: 3e15fcb52f 42e64
30: 86c1652daae39aff
31: 5610423f7f45d049
32: 123f b59491d2c e
33: d6401de758c6ac18
34: 6766a1f9cbf9f420
35: f716f45d 97e1ef1
36: 50ce 2 cee7ab02c
37: c72e14be9aadf547
38: 32883bb192554672
39: 551b 73ba585 0ed
40: a43fe833708e214d
41: 1a35fb176f93137c
42: 604dfa44604e2f3c
43: 64d0c1fe ace3e6b
44: b56763e5ef4f2860
45: d08e 9241a928f1c
46: eb6ecfa03f5a90 b
47: d9a69d5062dbd274
48: e9dd4bcfc783d8ef
49: 8c61f2c1c0aba052
50: b2156b9f4c953c6e
51: 5ce973f01aefe749
52: 346b4fba2befc977
53: f5f25ca817 01518
54: f713887f83ecc5aa
55: 4f99c6cd 1ba 189
56: 3d715ea97f 8bc62
57: d48a76365af28e3e
58: 958a2f5e6aae18ee
59: 3d502049f1bb8b44
60: 2145dfb04c7c5159
61: 1d1b 2591ea2146f
62: 63b0 ed6c459ebf1
63: fee84b72fd86d9c6
64: 53e07d8c9aecf782
65: ca6a94a6af 6211e
66: 916ef7af805474eb
67: ebef4ab4f4ef3b51
68: 62245ddfc5 2ea 7
69: e614171bd48a3291
70: 9bde64e6465 5ed
71: 19df12969ffaf397
72: 15bb898f16e8b14e
73: f33bbfcad07cb113
74: c3c146eb4c6cb684
75: dfd4594ddb23e483
76: 354a 986d5c3d4c1
77: 2764ef3794124748
78: 252c52dc3c52db93
79: d9e525eee9207343
80: 8a7ce3aa4abedcc6
81: 27d4cf875633331a
82: 551b8ba5 6 7 b99
83: 925393f653decef8
84: 126d76beaacd1cbb
85: 97c53e76d0ee7ec3
86: a3cab68067 e70f8
87: f98f126aab3a 8de
88: 32a14e99d1563 9
89: edf6c7828cd32b7
90: 549825251d7a 81c
91: 1dab1e1c ea8fe41
92: 9769e73dbbf49d5a
93: bfa7 657 a2b8dcb
94: 584dc215f9e1dd80
95: c2ad4813d35bd5e0
96: 45b5fa1ec9b78dd6
97: 8be9cce05deca0 e
98: 115223a726b35f17
99: 993a702fb9f61eb9
100: a8fc59e451 b4ee4
101: f4793cae1cb7a44e
102: d3a1f66e90b9 092
103: 2f5873 b79c1a66e
104: 25d84cfabf36eb2f
105: 7c1c26f7ac41d4d8
106: 8782dba2c9107352
107: 9a757a5bd739 674
108: 45a07bd4fe daa24
109: b824d790deb45d93
110: 96211e 0ba9654d4
111: f38c55ef33634cd4
112: 80b8d9cbe6ed41bf
113: a854444d9aa9 6 6
114: b0de3f ebd8cf9d9
115: f5987738cbbc5dcf
116: 1b24dee3298651f9
117: 271836b9864edc2e
118: 32696c1bd87399f6
119: 63be3cc21c779c3f
120: 6cebda765da63dcf
121: 9836 c26f469dac9
122: 9d7a495a9d9db1eb
123: a098f2cc77 03cae
124: 8c28cf1483ae3632
125: f1fbcb43 d4a353e
126: b8b8dcb35432c91f
127: be2e68c7753ed4ee
128: ee91dd a438d401e
129: cd697e3138f1c6f5
130: 238c63f57b51f 3
131: f722ac9fff68fc83
132: 1a 3ab3ed0691f2f
133: 3ac8f1abcab87e29
134: 772cf2a46f99e556
135: 441d1a3b7df73621
136: 5bf2cc fbf776be7
137: 5889dbe3c6595dcb
138: ff14336cf2 06345
139: 30b6b5b1c2b4de f
140: 885ac0a79bfc934b
141: 978b9578b96971ba
142: 5d 5c6 7a9befe70
143: d41f796d7cbd212e
144: 6ae590ecac1f20c1
145: 76846b315b9e 3f9
146: f59395b1e8d0df c
147: 6acbaab87e8fa341
148: 9c4ed13051623f2d
149: 1256 05350a823dd
150: 9eab1caf312d2143
151: d274 d749b407613
152: 4d4ab4 16a73ff14
153: 9f3454 89fef3574
154: 6f88931e65 b1b90
155: 98f39c27e8acb83f
156: 1ddd73e1f4d070a8
157: aad4342ee11213 7
158: 31d3 1e8ca95565c
159: 5a5dceb93150d453
160: a37d 0efadfede7b 161: dc3ff1fc6b9df7c7
162: 97f6189f32375ef4
163: fdb489d096a6bc59
164: c5889033 4925869
165: fd1e935984b96a1c
166: 92c857c22b26ffca
167: 35ef33bd d884726
168: 4ca32c9541b466da
169: 22947ac6d2 eab94
170: 8eb377448011ff 5
171: 2b8c5eb72e72224f
172: b4e75dff2f4abfd
173: 2ad6a76587431a25
174: 26dc26b3bbcb95f9
175: 2beb20d4aa864b9f
176: a8afa4538b4560e5
177: c7ff2ae3 0 067a9
178: 9555ec5197979453
179: d78964ad32b75f71
180: df0927f29 45c4f
181: 733cb19129ef6363
182: 1751f1d5d1131b4c
183: e0 f712d4259826f
184: 94c26c7f 17b79f1
185: f6354657493595b9
186: 75fab267a01d99f9
187: 7535ca412da5f785
188: 2f2df7fabf34f7f5
189: 1791f01da9fd8514
190: dd51fba1b39bf75e
191: a4bb82b38127718f
192: 7a7a7e1846f6a8 0
193: 9ff9b8cb926dbcdd
194: 3ffe835d812b5cea
195: d19d218967b874e2
196: a37149adac5fa567
197: ce3b8a87bdc812a1
198: 61a8528450f652 5
199: 8a5163a762d01351
200: 70b95f9f37967690
201: 48bbf7f19e61c55
202: 5520eabca2 ee2ce
203: 9e3557f019f4cdb1
204: abfbc8d830c4a3e5
205: 71 5 e55494056d4
206: 795e7af14dc f88
207: d6f0 44dd34d296b
208: 937e88b738bd87ca
209: 652b9bb421e2f661
210: 1c29bc839946e5c0
211: f82b73a6da 3afe5
212: 86 bb5bb8ba332af
213: a7a56d82e8f58463
214: 1159f8623f8b6c27
215: cc8daae4743de788
216: b62948367da4a5f5
217: 01a8ca9e7a08942
218: afcfa4334fd32c25
219: 1cbfb3edea235abc
220: 74e14f96fe3c93 6
221: 3832 1 f66 c8c65
222: be33c8de1145ac23
223: ae6896ab84df8fea
224: 86dbd0c55493864a
225: 1796d39eac601536
226: e49232 65e f4283
227: 4b3159 58996 e78
228: b5bed6aac7d0 529
229: 65ee a3c 3c5ac1c
230: dee87095de cd62c
231: bbc2 6e2437360d0
232: c932662da11c99 b
233: e9e1afd3b163da7f
234: 60804d a522bfd25
235: c6c2a42cf89b c58
236: 8ae18a36289ec858
237: 6c18c84aff6126c7
238: 22a9e2dacd8cd2f
239: 34da3ccaf1399a7a
240: c07049ada67f1d78
241: b63b608935e8195d
242: fd 98db31f77 740
243: ccb1d5a47673939d
244: 328aac7a61e61dd3
245: 8ff17c789b1f39a7
246: 18c62582f43130bf
247: 57f077a2ce717e28
248: a9d5b986a2fc52d1
249: bfe226ff792f11 e
250: c58a7d0 87c3965
251: 9e3e2aac435ce385
252: edf97ab7b0e843db
253: db765 6163f26fb
254: d279699ee39474ac
255: 6644f7aa1b5c4a1b One of the significant differences between the use of XOR and shift described herein and hash-AV referred to above is that in hash-AV the data itself is being hashed, which means that repeated characters have a self-canceling effect, making the hash virtually useless. According to an embodiment, however, bytes from an input stream index into a table (e.g. index table 204) of expanded and carefully chosen entry values that are used to create the resulting hash value.

Another significant difference is that the shift operation described in hash-AV is not a circular shift. Rather, the shift operation in hash-AV shifts out an entire element. Thus, the shift operation described in hash-AV is to remove the oldest elements from the cumulative hash, whereas the shift operation described herein uses shift to modify the cumulative hash value so that repeated characters do not cancel earlier characters (since a doubly applied XOR operation is the same as no operation at all). The possibility of canceling characters is another reason why the entry values in the index table are carefully chosen so that shifted entry values have a low correlation to any other entry value in the table. Therefore, the shift disclosed in hash-AV removes the effect of a given element from the cumulative hash, while a shift operation described herein is to prevent auto-correlation of repeated characters.

2.1.2 No Index Table

According to another embodiment, the process described in FIG. 1 is performed without the use of an index table. In such an alternative, step 104 is omitted because entry values corresponding to bytes M and M+L are not retrieved. In step 108, byte M is shifted instead of shifting the entry value corresponding to byte M. In step 110, the previous hash value is XOR'ed with shifted byte M instead of with the shifted entry value corresponding to byte M. In step 112, the temporary value from step 110 is XOR'ed with byte M+L instead of with the entry value corresponding to byte M+L.

2.2 Linear Feedback Shift Registers

An alternative approach is to provide a number of different hardware finite state machines which do not have the reversible characteristics of a rolling hash. The number of different hardware finite state machines is equal to the number of elements in a substring (i.e. "window size"). The window size is usually less than a dozen bytes. Each finite state machine is first initialized to a known first state. Then, the bytes corresponding to the current "window" are sequenced through bit by bit to determine the hash value.

According to an embodiment, the finite state machines are linear feedback shift registers (LFSRs). A LFSR is a shift register whose input bit is a linear function of its previous state. The input bit is driven by the XOR of a new bit from the next element in an input stream and some bits of the overall shift register value. The initial value of a LFSR is called the seed and the list of the bit positions that affect the next state is called the tap sequence. Because the operation of the register is deterministic, the sequence of values generated by the register is determined by its current (or previous) state. A LFSR with a well-chosen seed and tap sequence can generate a sequence of bits that appears random and thus generates useful hash values.

Figure 3A:
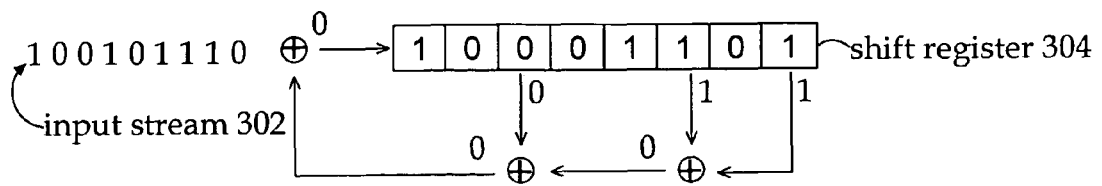
FIGS. 3A-D are diagrams that illustrate how a linear feedback shift register may process elements from an input stream, according to an embodiment.

FIGS. 3A-D are diagrams that illustrate how a LFSR may operate, according to an embodiment. FIG. 3A illustrates an initial input stream 202 and a shift register 304 which comprises 8 bits. The bit sequence in register 304 may indicate the seed (i.e. initial state) or the bit sequence may be a result of one or more iterations of the tap sequence in generating a hash value.

The tap sequence of register 304 (as indicated by some of the arrows) is 3, 6, and 8, indicating the $3^{rd}$ bit, $6^{th}$ bit, and $8^{th}$ bit, respectively. The bits at the foregoing bit positions, including the incoming bit from input stream 302, are XOR'ed together to generate a bit that will be shifted into the first bit position in register 304, while each of the other bits are shifted right, with the last bit shifted out of the register.

Figure 3B:
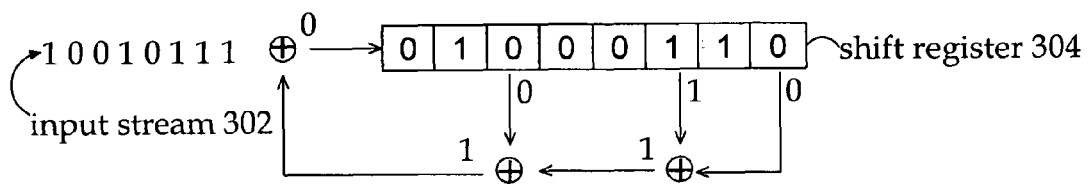
Figure 3C:
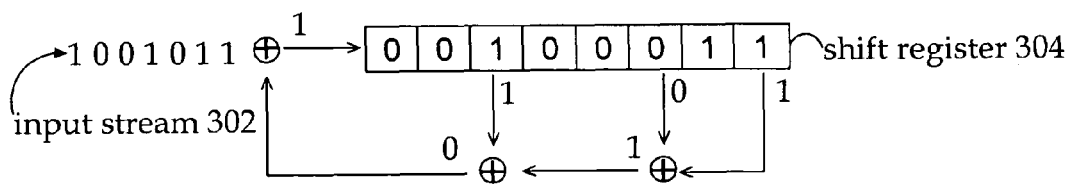
Figure 3D:
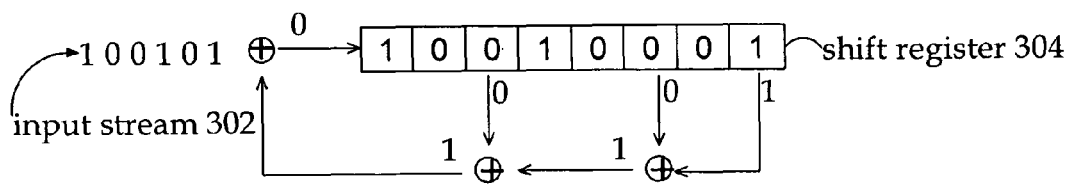

As indicated in FIG. 3A, XOR'ing bits 1, 1, 0 (from register 304) and 0 (from input stream 302) results in a 0 bit. Register 304 of FIG. 3B illustrates the result of shifting in the new 0 bit and shifting the remaining bits in register 304. FIG. 3C and FIG. 3D provide further iterations of an LFSR state machine given input stream 302 and register 304.

As an example of how a set of LFSRs operate to generate a hash value after each element in a given window of the input stream are read, suppose that 1) the window size is 9 bytes, 2) each element is one byte, and 3) the hash result is 64 bits. Therefore, at least nine different linear feedback shift registers (LFSR) are constructed to operate on a 72 bit (9 bytes*8 bits/byte) stream, wherein each LFSR contains at least 64 bits and operates on a different 72 bit stream. Each LFSR is initialized to the same known state (i.e. seed), uses the same state machine (i.e. tap sequence), and operates on the 72 bit sequences that start 8 bits apart.

According to this example, if the data stream is:
45 93 24 32 F3 2C E9 D1 79 2A 3E 87 92FF 2F FB A6 89 9A . . .
then of the nine shift registers, each would operate on the following 72 bit sequences:

| LFSR [1] | 45 | 93 | 24 | 32 | F3 | 2C | E9 | D1 | 79 |
| LFSR [2] | 93 | 24 | 32 | F3 | 2C | E9 | D1 | 79 | 2A |
| LFSR [3] | 24 | 32 | F3 | 2C | E9 | D1 | 79 | 2A | 3E |
| LFSR [4] | 32 | F3 | 2C | E9 | D1 | 79 | 2A | 3E | 87 |
| LFSR [5] | F3 | 2C | E9 | D1 | 79 | 2A | 3E | 87 | 92 |
| LFSR [6] | 2C | E9 | D1 | 79 | 2A | 3E | 87 | 92 | FF |
| LFSR [7] | E9 | D1 | 79 | 2A | 3E | 87 | 92 | FF | 2F |
| LFSR [8] | D1 | 79 | 2A | 3E | 87 | 92 | FF | 2F | FB |
| LFSR [9] | 79 | 2A | 3E | 87 | 92 | FF | 2F | FB | A6 |

The LFSR can be any linear feedback shift register implementation. According to this example, once a LFSR reads in 9 bytes, the hash value indicated by the LFSR is sent to a data structure indicating the hash values of stored digital signatures to determine whether the new hash value matches any of the stored hash values. If a match exists, execution may proceed as is done with the XOR/shift implementation described above. The LFSR is then re-initialed to its original state and the process begins again for the next byte from the input stream. Thus, after LFSR[1] reads in 9 bytes (i.e. where the last byte is 79), the LFSR is re-initialized to it original state and the next byte is read in (i.e. 2A).

Therefore, each LFSR operates independently and in parallel over staggered windows to create a hash such that each LFSR creates one hash result for a given offset into the input stream being searched. Thus, when byte 2A is read into LFSR [1] it is also read into the other LFSRs. Therefore, each byte is only read once from the input stream.

2.3 Cyclic Redundancy Check

According to an embodiment, a cyclic redundancy check (CRC) on L bytes in a register is performed in hardware to generate a hash value. A CRC is a type of hash function used to generate a fixed number of bits, typically 32 bits. The hash value is used to index into a memory that stores a hash value for each of a plurality of stored digital signatures. If the hash value of a particular sequence of L bytes matches a hash value of a stored digital signature, then a byte-by-byte comparison is made between the L bytes in the register and the stored digital signature. In the case where the stored digital signature is longer than L bytes, then the approach described above for comparing L+N bytes from the input stream with the stored digital signature may be followed.

3.0 Implementation Mechanisms—Hardware Overview

Figure 4:
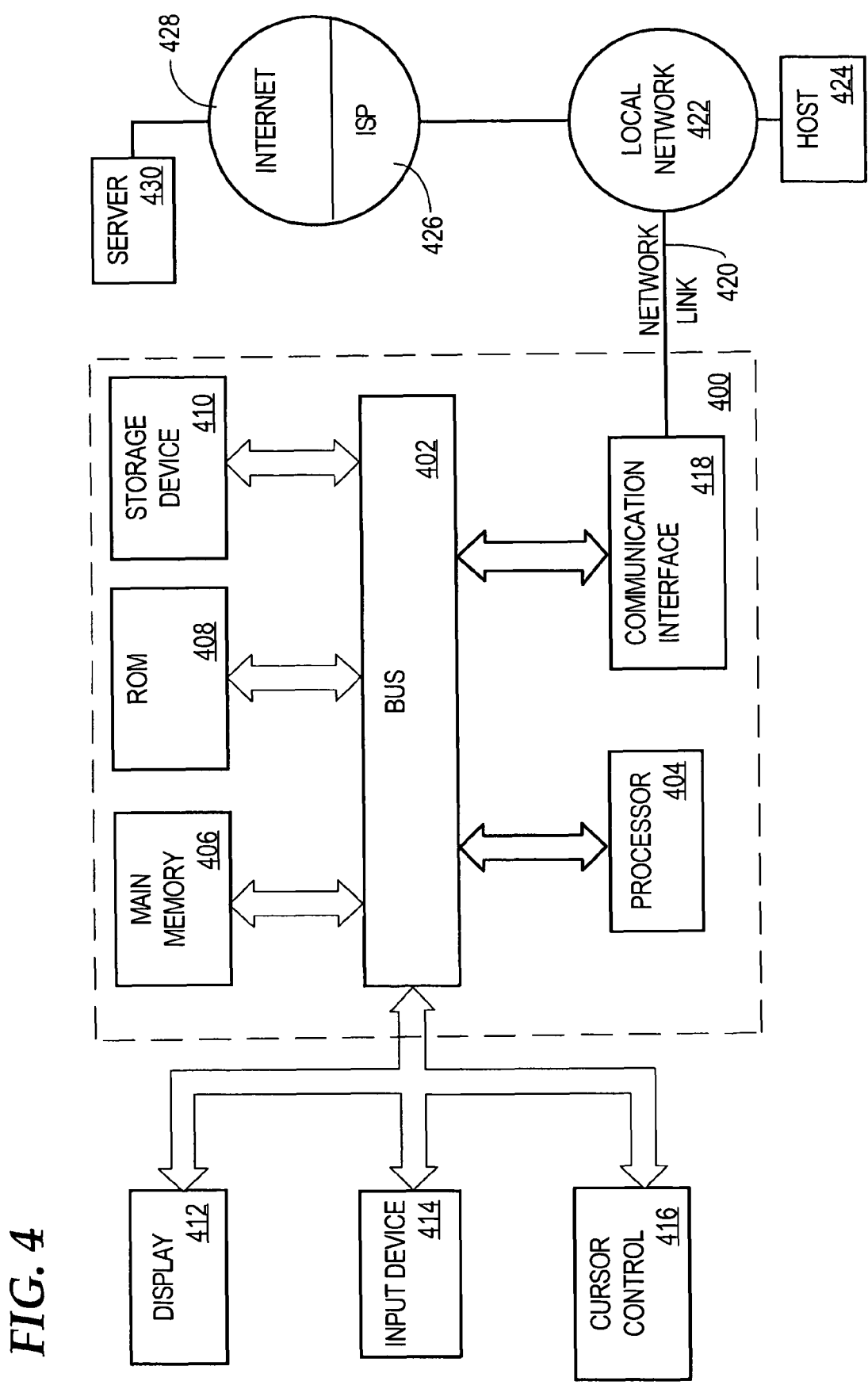
FIG. 4 is a block diagram that illustrates a computer system upon which a method for constructing a repair path may be implemented.

FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for automatically detecting and suggesting recommended configuration for network device interfaces. According to one embodiment of the invention, automatically detecting and suggesting recommended configuration for network device interfaces is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for automatically detecting and suggesting recommended configuration for network device interfaces as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A circuit, comprising:
   a byte shift register array comprising a hash key output and a plurality of linear feedback shift registers (LFSRs), wherein each LFSR of the plurality of LFSRs implements a same finite state machine and is initialized to an initial state;
   a memory having a hash key input coupled to the hash key output and a match output, and the memory comprising a plurality of stored digital signatures each keyed to a particular hash key; and
   logic coupled to the byte shift register array which, when executed, is operable for performing the steps of:
   reading a subset of input elements, of a plurality of input elements, into each LFSR of the plurality of LFSRs;
   (a) reading a next input element, of the plurality of input elements, into each LFSR of the plurality of LFSRs;
   (b) determining, based on a hash key indicated by one of the LFSRs of the plurality of LFSRs and the memory, whether said indicated hash key matches a hash key of a stored digital signature of the plurality of digital signatures, wherein the indicated hash key corresponds to multiple elements of the plurality of input elements;
   (c) resetting said one of the LFSRs to the initial state without resetting any of the other LFSRs of the plurality of LFSRs; and
   repeating (a)-(c) for each next input element in the plurality of input elements.

2. The circuit of claim 1, wherein the stored digital signatures correspond to possible software viruses.

3. The circuit of claim 1, wherein the logic, when executed, is operable to notify a software or hardware component associated with the circuit when the new hash key matches the hash key of a stored digital signature of the plurality of stored digital signatures.

4. The circuit of claim 1, wherein each input element of the plurality of input elements corresponds to a byte in size.

5. The circuit of claim 1, wherein each input element of the plurality of input elements does not correspond to a byte in size.

6. A method, comprising:
   reading a subset of input elements, of a plurality of input elements, into each linear feedback shift register (LFSR) of a plurality of LFSRs, wherein each LFSR of the plurality of LFSRs implements a same state machine and is initialized to an initial state;
   a memory having a hash key input and a match output, and the memory comprising a plurality of stored digital signatures each keyed to a particular hash key;
   (a) reading a next input element, of the plurality of input elements, into each LFSR of the plurality of LFSRs;
   (b) determining, based on a hash key indicated by one of the LFSRs of the plurality of LFSRs and the memory, whether said indicated hash key matches a hash key of a stored digital signature of the plurality of digital signatures, wherein the indicated hash key corresponds to multiple elements of the plurality of input elements;
   (c) resetting said one of the LFSRs to the initial state without resetting any of the other LFSRs of the plurality of LFSRs; and
   repeating (a)-(c) for each next input element in the plurality of input elements.

7. The method of claim 6, wherein the stored digital signatures correspond to possible software viruses.

8. The method of claim 6, further comprising notifying a software or hardware component associated with the circuit when the new hash key matches the hash key of a stored digital signature of the plurality of stored digital signatures.

9. The method of claim 6, wherein each input element of the plurality of input elements corresponds to a byte in size.

10. The method of claim 6, wherein each input element of the plurality of input elements does not correspond to a byte in size.

11. One or more non-transitory computer-readable media storing instructions which, when executed by one or more processors, cause:
   reading a subset of input elements, of a plurality of input elements, into each linear feedback shift register (LFSR) of a plurality of LFSRs, wherein each LFSR of the plurality of LFSRs implements a same state machine and is initialized to an initial state;
   a memory having a hash key input and a match output, and the memory comprising a plurality of stored digital signatures each keyed to a particular hash key;
   (a) reading a next input element, of the plurality of input elements, into each LFSR of the plurality of LFSRs;
   (b) determining, based on a hash key indicated by one of the LFSRs of the plurality of LFSRs and the memory, whether said indicated hash key matches a hash key of a stored digital signature of the plurality of digital signatures, wherein the indicated hash key corresponds to multiple elements of the plurality of input elements;
   (c) resetting said one of the LFSRs to the initial state without resetting any of the other LFSRs of the plurality of LFSRs; and
   repeating (a)-(c) for each next input element in the plurality of input elements.

12. The one or more non-transitory computer-readable media of claim 11, wherein the stored digital signatures correspond to possible software viruses.

13. The one or more non-transitory computer-readable media of claim 11, wherein the instructions, when executed by the one or more processors, further cause notifying a software or hardware component associated with the circuit when the new hash key matches the hash key of a stored digital signature of the plurality of stored digital signatures.

14. The one or more non-transitory computer-readable media of claim 11, wherein each input element of the plurality of input elements corresponds to a byte in size.

15. The one or more non-transitory computer-readable media of claim 11, wherein each input element of the plurality of input elements does not correspond to a byte in size.

* * * * *

UNITED STATES PATENT AND TRADEMARK OFFICE
CERTIFICATE OF CORRECTION

| | | |
|---|---|---|
| PATENT NO. | : 7,941,435 B2 | |
| APPLICATION NO. | : 11/497868 | |
| DATED | : May 10, 2011 | |
| INVENTOR(S) | : Jung-Hong Kao et al. | |

It is certified that error appears in the above-identified patent and that said Letters Patent is hereby corrected as shown below:

COLUMN 14

Claim 1: At line 58 after "plurality of" and before "digital" insert --stored--.

COLUMN 15

Claim 6: At lines 16-18 delete "a memory having a hash key input and a match output, and the memory comprising a plurality of stored digital signatures eached keyed to a particular hash key;"

At line 22 delete "the memory," and insert --a memory comprising a plurality of stored digital signatures each keyed to a particular hash key,--.

At line 24 after "plurality of" and before "digital" insert --stored--.

COLUMN 16

Claim 11: At lines 9-11 delete "a memory having a hash key input and a match output, and the memory comprising a plurality of stored digital signatures eached keyed to a particular hash key;"

At line 15 delete "the memory," and insert --a memory comprising a plurality of stored digital signatures each keyed to a particular hash key,--.

At line 17 after "plurality of" and before "digital" insert --stored--.

Signed and Sealed this
Fourteenth Day of June, 2011

David J. Kappos
*Director of the United States Patent and Trademark Office*